United States Patent [19]
Aulagner et al.

[11] Patent Number: 5,549,195
[45] Date of Patent: Aug. 27, 1996

[54] MOVABLE SURFACE WITH ARTICULATED PLATES

[75] Inventors: Michel Aulagner, Saint-Ferreol-d'Auroure; Serge Esteveny, Saint-Juste-Saint-Rambert, both of France

[73] Assignees: Entre-Prises, Le Touvet; Centre Stephanois de Recherches Mecaniques Hydromecaniques et Frottement, Andrezieux-Boutheon, both of France

[21] Appl. No.: 256,948

[22] PCT Filed: Nov. 22, 1993

[86] PCT No.: PCT/FR93/01144

§ 371 Date: Jul. 27, 1994

§ 102(e) Date: Jul. 27, 1994

[87] PCT Pub. No.: WO94/12249

PCT Pub. Date: Jun. 9, 1994

[30] Foreign Application Priority Data

Nov. 27, 1992 [FR] France .................... 92 14590

[51] Int. Cl.$^6$ .................... B65G 17/06
[52] U.S. Cl. .................... 198/850; 482/37
[58] Field of Search .................... 198/850; 482/37, 482/52, 51

[56] References Cited

U.S. PATENT DOCUMENTS

| | | | |
|---|---|---|---|
| 3,592,466 | 7/1971 | Parsons | 272/69 |
| 3,807,548 | 4/1974 | Bergeron | 198/195 |
| 3,985,224 | 10/1976 | Harvey | 198/851 |
| 4,614,337 | 9/1986 | Schonenberger | 272/69 |
| 4,687,195 | 8/1987 | Potts | 272/69 |
| 4,708,337 | 11/1987 | Shyu | 272/69 |
| 4,718,541 | 1/1988 | Wilding | 198/699.1 |
| 4,848,737 | 7/1989 | Ehrenfield | 272/70 |
| 5,112,043 | 5/1992 | Gilfillian | 482/53 |
| 5,125,877 | 6/1992 | Brewer | 482/7 |

FOREIGN PATENT DOCUMENTS

| | | | |
|---|---|---|---|
| 0698839 | 10/1953 | Germany | 198/850 |
| 3739702 | 6/1989 | Germany . | |
| 0646998 | 2/1979 | U.S.S.R. | 482/37 |
| 91/11226 | 8/1991 | WIPO . | |

*Primary Examiner*—William E. Terrell
*Assistant Examiner*—Tamara Kelly
*Attorney, Agent, or Firm*—Oliff & Berridge

[57] ABSTRACT

Articulated plates (L) are assembled in combination with at least two drive drums supported by a framework (6). The plates (L) present longitudinally, two by two, complementary guiding and articulation profiles (R) and (C) defined to create at least one continuous flat face. The plates are coupled to one another by flexible links (1).

10 Claims, 6 Drawing Sheets

MOVABLE SURFACE WITH ARTICULATED PLATES

BACKGROUND OF THE INVENTION

The invention relates more particularly to a device for achieving a mobile surface of the conveyor belt type for the purpose of various applications. The invention applies notably, but not exclusively, to achieving a practice climbing wall.

STATE OF THE ART

Generally, most climbing walls are formed from a totally fixed structure. The climbing holds are fitted and secured on a vertical or inclined flat surface which is totally fixed.

Climbing surfaces subjected to drive means have also been proposed, to subject them to a continuous movement. These arrangements make it possible to move on the climbing surface in the opposite direction to that of its drive movement.

Different solutions have been proposed, both for the drive means and for the design as such of the climbing surface.

SUMMARY OF THE INVENTION

The problem which the invention proposes to solve is to achieve a mobile surface having a high speed of movement and a completely silent operation. In addition, and in the case of an application to a climbing wall, one of the problems arising is to be able to achieve a surface from articulated plates having the object of obtaining a totally flat and smooth active surface not leaving any rough edges on which the climber could catch a limb.

To solve these different problems, a device has been designed and developed for achieving a mobile surface by means of articulated plates assembled in combination with at least two drive drums supported by a framework. The plates present longitudinally, two by two, complementary guiding and articulation profiles defined to create at least one continuous flat face, said plates being coupled to one another by means of flexible links.

To solve the problem posed by guiding and articulating the plates, having the object of creating a flat face without any sunken or raised rough edges, the profiles are formed by sunken or raised imprints of rounded transverse cross-section, said imprints being joined on the one hand to one of the faces of the plates by a straight edge perpendicular to said face and on the other hand to the other face by a straight edge inclined with respect to this other face.

From this basic design, the plates can be achieved according to several embodiments.

According to a first embodiment, the plates are of a single type, the profiles of any one plate are formed on one side by the sunken imprint and on the other side by the raised imprint.

According to a second embodiment, the plates are of two types, the profiles of any one plate are formed, for each side, by the sunken imprints constituting the first type or, for each side, by the raised imprints constituting the second type.

According to another embodiment, the plates are of a single type, each of the sides presenting a sunken imprint designed to receive an inserted element in the form of a cylindrical part, to perform guiding and articulation between the plates.

To solve the problem posed of enabling articulation of the plates, notably with respect to the drive drum, the inclined straight edge is established withdrawn from the perpendicular straight edge to leave, after two plates have been coupled, a free space enabling the plates to be articulated up to the stop position of two inclined straight edges.

To solve the problem posed of performing coupling of the plates, in combination with the guiding and articulation profiles, the flexible links are engaged in slots provided in the thickness of the plates, from each transverse end and in a manner parallel to the faces of said plates, to form a continuous coupling.

The width of the link is greater than the depth of the slots, so as to extend beyond the plates in order to cooperate with a guiding path presented by the framework.

Advantageously, the links are formed by a notched belt made of flexible material, notably plastic. These arrangements enable differences in size between the plates to be taken into account and consequently a constant pitch to be kept. The plates can therefore be fixed according to a given pitch, preventing any bunching notably in the case where the surface is disposed vertically or appreciably vertically.

To solve the problem posed of obtaining perfectly silent operation, the ends of the drive drums are equipped with components of the pneumatic type, on which the plates bear.

In the case of an application of the device to a climbing wall, a protective housing is fitted in the upper part of the framework, at the level of the upper drive drum, so as to leave apparent only the continuous flat face resulting from the joined position of the plates.

Advantageously, the device is equipped with a servo control system able to accelerate the drive drum or drums when the climber is in the bottom position on the wall and to slow down said drum or drums when the climber is in the top position.

BRIEF DESCRIPTION OF THE DRAWINGS

Other advantages and features will become more clearly apparent from the following description of illustrative embodiments of the invention, given as nonrestrictive examples only and represented in the accompanying drawings in which.

DETAILED DESCRIPTION OF THE INVENTION

The device according to the invention is applied for achieving any type of mobile surface, by means of articulated plates (L), mounted in combination with driving drums (T) and (T1) supported by a framework (6). The figures and description show an application of the device to achieving a climbing wall. This example is not however to be considered as being restrictive.

According to the invention, the plates present longitudinally, two by two, complementary guiding and articulation profiles, defined to create at least one continuous flat face (F). The plates (L) are coupled to one another by means of flexible links (1).

Figure 1:
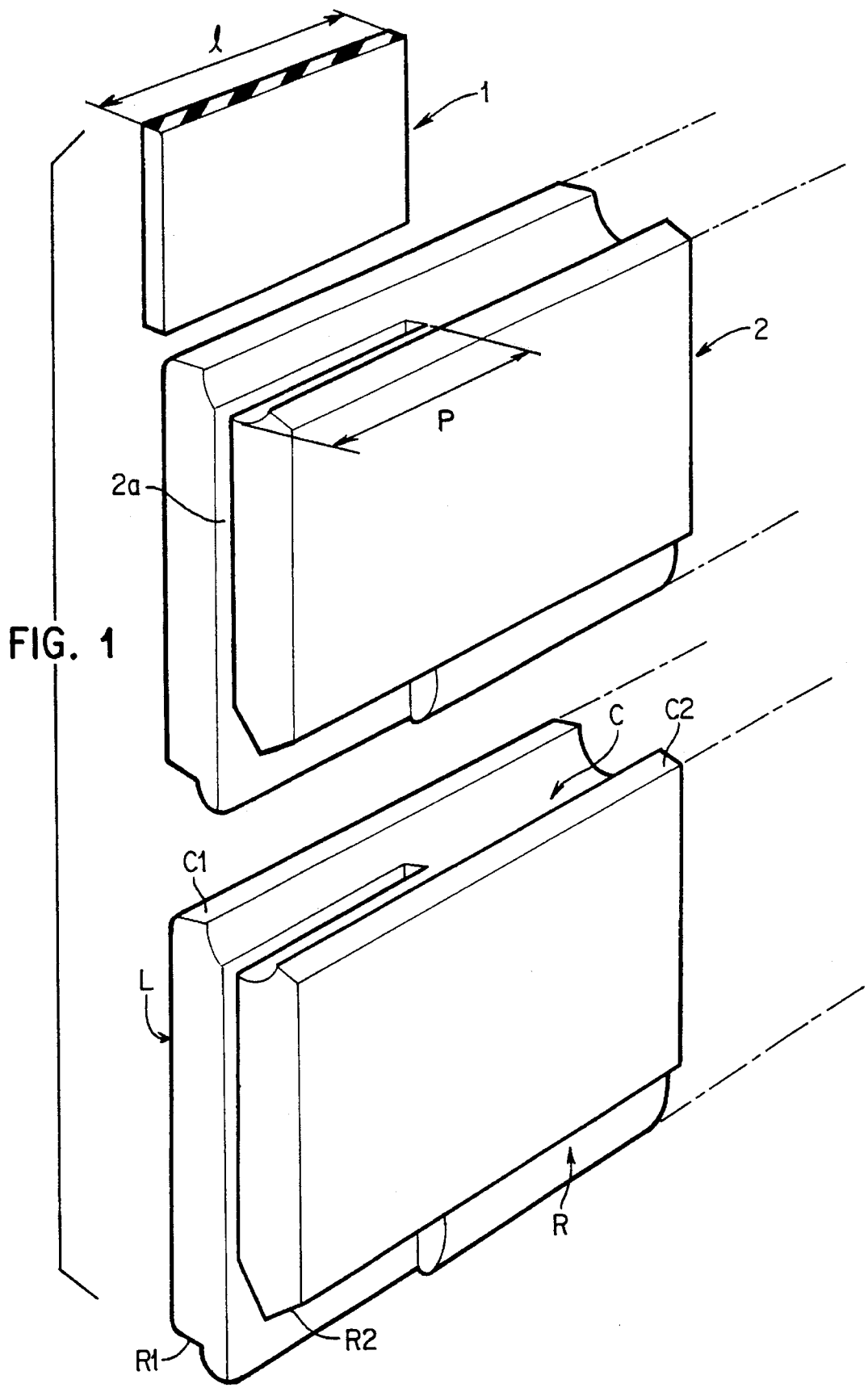
FIG. 1 is a perspective view before assembly of the component parts of the device formed by the plates and the flexible link. In this figure, the plates are of a single type.

As can be seen notably from FIG. 1, the longitudinal profiles are formed by sunken imprints (C) and raised imprints (R). The imprints (C) and (R) are of rounded transverse section, very appreciably in the form of a semicircle.

According to another feature of the invention, the imprints (C) and (R) are connected on the one hand to the face (F) of the plates by a straight edge (C1) and (R1) and, on the other hand, on the opposite face (F1), by a straight edge inclined with respect to this face (C2) and (R2).

From this basic design, the surface can be achieved either using plates of a single type or using plates of of two types.

Figures 3, 4:
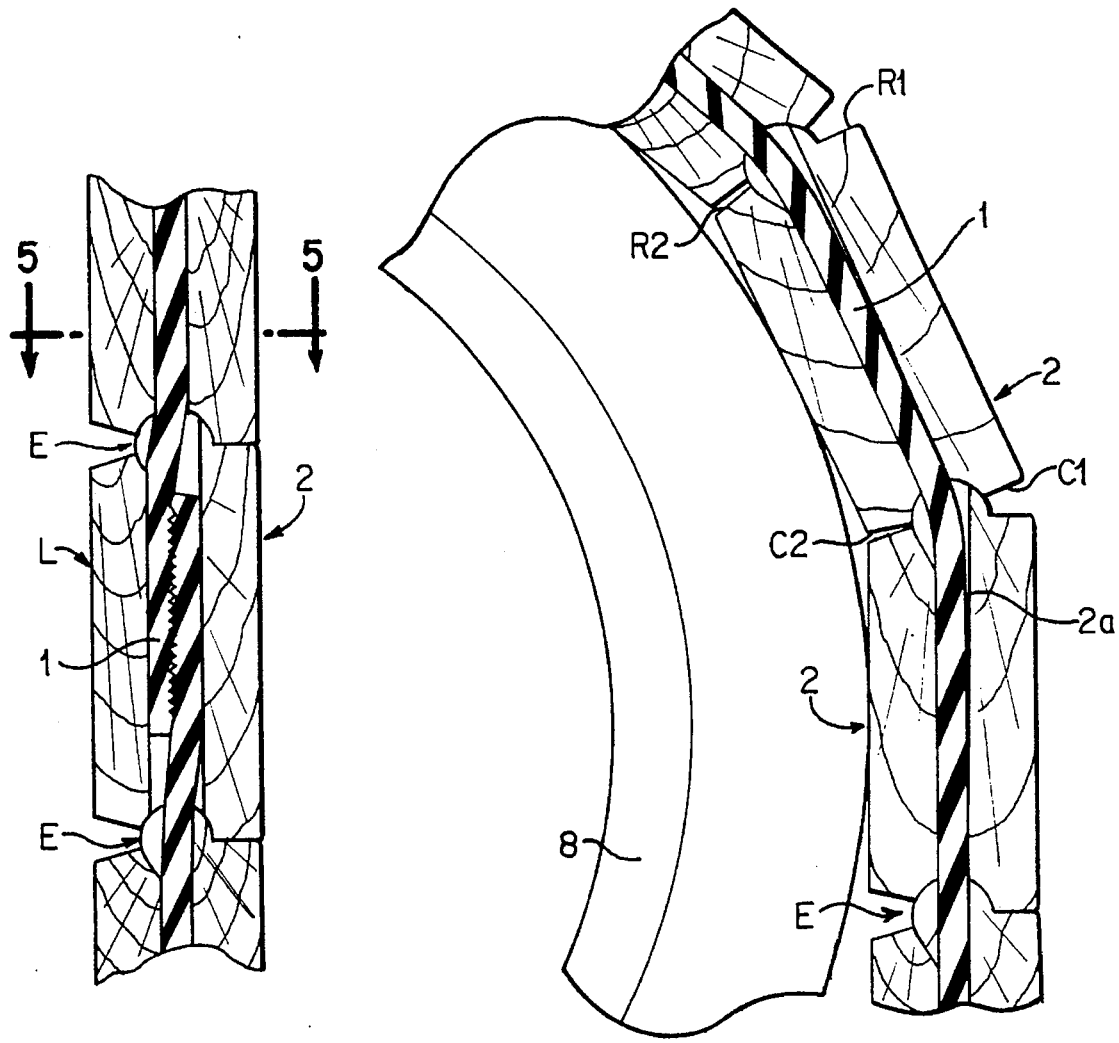
FIG. 3 is a partial transverse sectional view showing coupling and articulation of the plates by means of the flexible link and in the case where the plates are mounted on a drive support.
FIG. 4 is a view showing an example of coupling of the ends of the flexible link.

In the case of plates of a single type (2), the longitudinal guiding and articulation profiles are formed on one side by the sunken imprint (C) and on the other side by the raised imprint (R) (FIGS. 1, 3, 4).

Still in the case of plates of a single type (4), the longitudinal guiding and articulation profiles are formed for both sides by the sunken imprint (C). An element (12) in the form of a cylindrical body is fitted and housed in each of the imprints to perform the guiding and articulation function.

Figure 2:
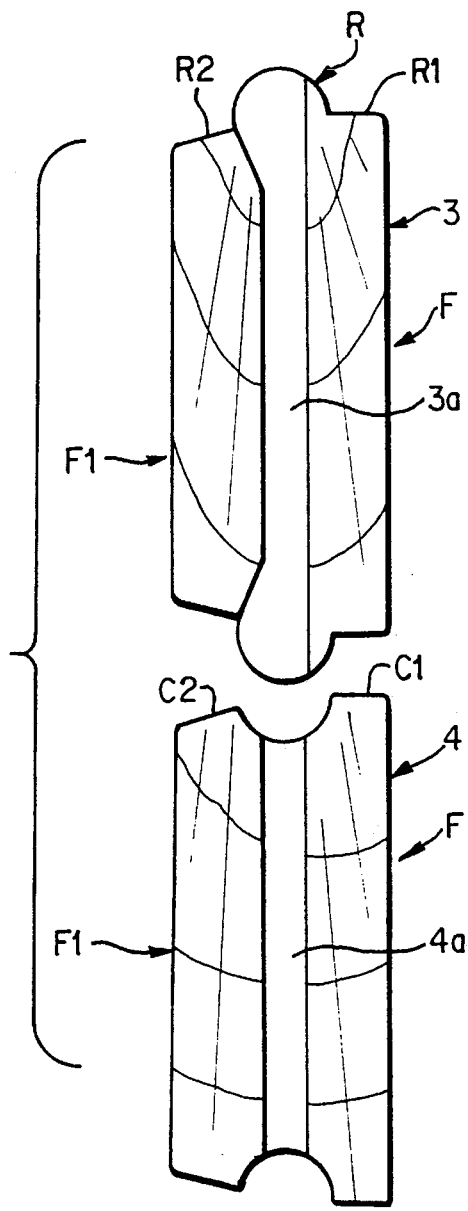
FIG. 2 is a transverse sectional view before assembly of two plates of two different types.

In the case of plates of two types (3) and (4), the longitudinal guiding and articulation profiles are formed, for both sides, by the sunken imprints (C) constituting the first type (4) or, for both sides, by the raised imprints (R) constituting the second type (3) (FIG. 2)

Whatever the manner in which the plates (L) are achieved, the inclined straight edges (R2) are established away from the perpendicular straight edges (R1). This results, after coupling of two plates (2) or (3) (4), i.e. engagement of the raised imprints (R)in the sunken imprints (C), in a free space (E) (FIG. 4) enabling articulation of the plates up to the stop or appreciably stop position of two inclined straight edges (C2) (FIG. 3).

It can also be seen, in this alignment position of the plates, that the perpendicular straight edges (C1) of the plates (2) or (3) (4) are pressing on one another and perfectly adjoining, for the surface resulting from superposition of the faces (F) of the plates to be strictly flat and not presenting any roughness at the level notably of the connecting parts of the edges (C1) (FIG. 4).

Figure 5:
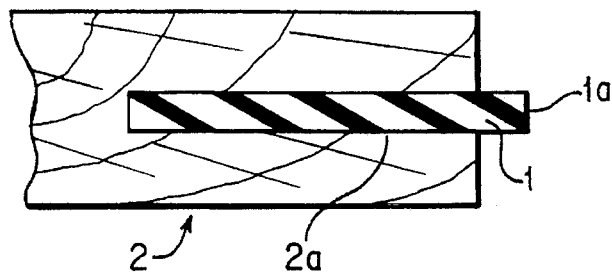
FIG. 5 is a transverse sectional view considered along the line 5—5 of FIG. 4.
Figure 6:
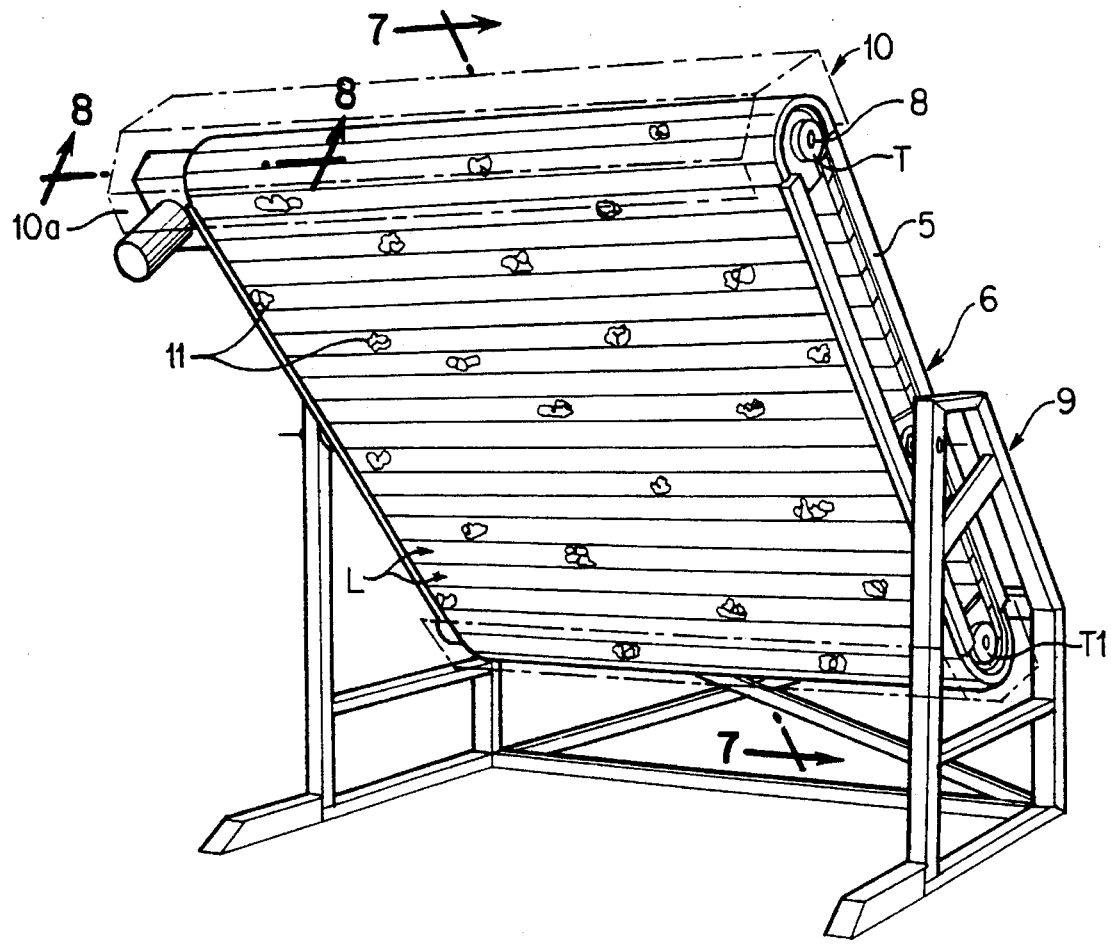
FIG. 6 is a perspective view showing application of the device to a climbing wall.
Figure 7:
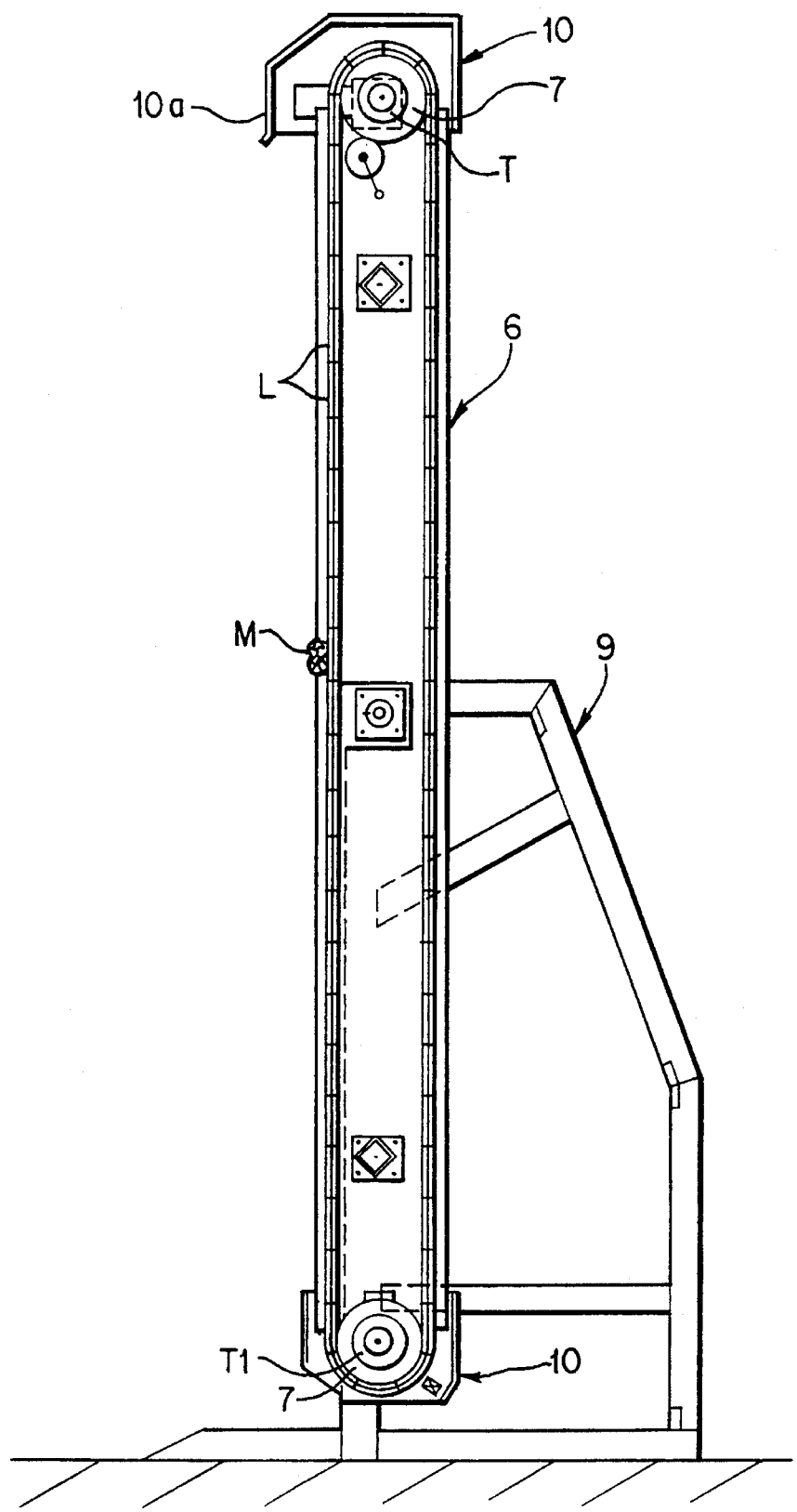
FIG. 7 is a transverse sectional view considered along the line 7—7 of FIG. 6.

According to another feature, the flexible coupling links (1) are engaged in slots (2a) or (3a) (4a) established in the thickness of the plates, at each of their transverse ends. These slots open out onto and are formed parallel to the faces (F) and (F1) of the plates involved. This results, after the plates have been mounted and engaged by the sunken and raised imprints (C) and (R) or engagement of the articulation cylinder (12) in the sunken imprints (C), in the flexible links (1) engaged in each of the slots (2a) or (3a) (4a) providing a continuous coupling forming an endless strip. The width (l) of the flexible link (1) is greater than the width (p) of the slots (2a) or (3a) (4a), to overlap onto the plates (FIG. 5). The object of the overlapping part (1a) is to cooperate with a guiding path (5) presented by a support framework (6) where the bearing surface resulting from assembly of the articulated plates, in the conditions indicated above, is mounted with driving ability.

Figure 2A:
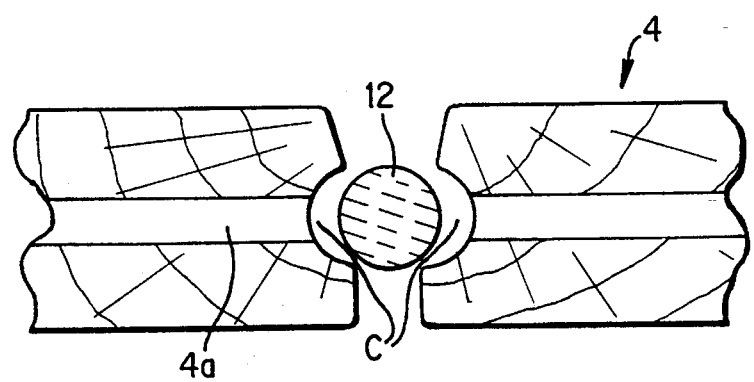
FIG. 2a is a transverse sectional view before assembly of two plates of a single type, in the case where articulation of said plates is performed by an inserted element.

It should be noted that in the embodiment illustrated in FIG. 2a, the length of the articulation cylinders (12) is smaller than the separation distance between two links (1) engaged in each of the transverse ends of the plates.

The coupling links (1), mounted at the ends of the plates, can be achieved according to different modes. In a preferred embodiment, the link is formed by a notched belt made of plastic material notably. These arrangements enable the differences in size which may exist between the different plates to be taken into account and consequently the same pitch to be kept. In the case where the surface is disposed vertically or appreciably vertically, such arrangements prevent the bunching phenomenon which could occur at the bottom part.

Joining of the free ends of the segments of the coupling belt can be performed in different ways. For example, as shown in FIG. 4, the ends are arranged overlapping, to place the notched parts of the belt in the imbricated position. For this purpose, the plate (2) or (3) (4) where the junction is made presents slots (2a) or (3a) (4a) of larger thickness.

Naturally, the coupling links (1) are engaged forcibly into the thickness of the slots (2a) or (3a) (4a).

Figure 8:
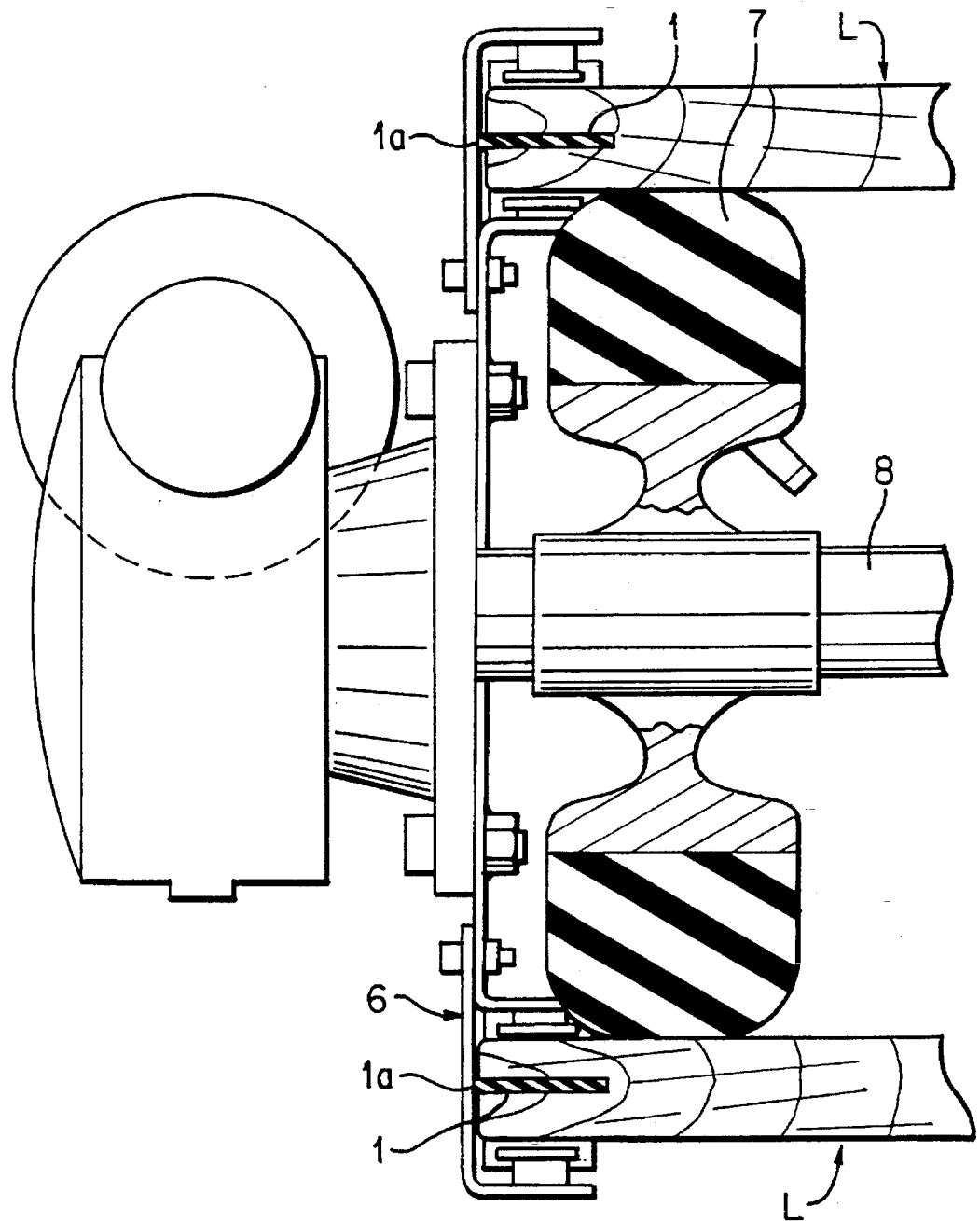
FIG. 8 is a longitudinal sectional view considered along the line 8—8 of FIG. 6.

As indicated, the bearing surface thus created is assembled in combination with driving drums (T) and (T1). The ends of these drums are equipped with elements of pneumatic type (7) (FIG. 8), on which the plates are bearing. The pneumatic elements (7) are fixed to the end of the drive shafts (8) of the drums.

The assembly thus defined finds a particularly advantageous application for achieving a climbing wall. The framework (6) receiving the articulated plates mounted on the pneumatics of the driving drums (T) and (T1) is mounted with an angular adjustment capacity, in a support frame (9). A protective housing (10) is fitted in the upper part of the framework at the level of the upper driving roller (T). This housing is determined in such a way as to allow only the continuous flat face resulting from the joined position of the plates to appear.

For this purpose, the housing has a front face (10a) which overlaps the part of the plates at the level of their breaks with the driving drum. It should be noted that the upper drum (T) can be driven by any suitable known means whereas the lower drum (T1) is mounted free in rotation.

Driving of the drums can be regulated by a servo system able to accelerate said drums when the climber is in a low position on the wall and to slow them down when the climber is in a high position. The wall is naturally equipped with all safety systems designed to cut the power supply to the drive motor or motors.

In addition, driving and angular adjustment of the surface can be subjected to any known programmable control system to automatically obtain such or such a succession of drive speed and angular adjustment value.

The climbing holds (11) of any suitable known type, are fixed in the thickness of the plates. The plates (2) or (3) (4) are advantageously made of wood.

The advantages are clearly apparent from the description.

We claim:

1. A climbing wall with a mobile surface, said wall comprising:

a framework for supporting at least an upper drive drum and a lower drive drum;

a plurality of plates that bear on the upper and lower drive drums, each plate comprising an external face, an internal face opposite the external face, a first end, a second end opposite the first end, guiding profile means located at one of the first and second ends, articulation profile means located at the other one of the first and second ends and having a cross section shape complementary to the guiding profile means, a pair of first straight edges extending perpendicularly from the external face to the guiding profile means and the articulation profile means, respectively, and a pair of second straight edges extending non-perpendicularly from the internal face to the guiding profile means and articulation profile means, respectively;

flexible coupling links for coupling the plates, the flexible links extending through a longitudinal slot in each plate, the slot being parallel to the external and internal faces; and a free space located between the second straight edges of adjacent plates for enabling the plates to be articulated up to a stop position upon engagement of the second straight edges, wherein the plates form at least one continuous flat face upon engagement of the first straight edges of adjacent plates.

2. The climbing wall according to claim 1, wherein the guiding profile means and the articulating profile means of each plate comprises a sunken imprint and a raised imprint, respectively.

3. The climbing wall according to claim 1, wherein the guiding profile means and articulating profile means comprise a sunken imprint at each end of each plate, each sunken imprint cooperating with a cylindrical body for acting as an articulating and guiding axis.

4. The climbing wall according to claim 1, wherein the guiding profile means and articulation profile means of one plate comprise a sunken imprint, and wherein the guiding profile means and articulation profile means of an adjacent plate comprise a raised imprint.

5. The climbing wall according to claim 1, wherein the width of each coupling link is greater than the depth of each longitudinal slot, each coupling link extending beyond the plates to cooperate with a guiding path located in the framework.

6. The climbing wall according to claim 1, wherein the upper and lower drive drums are equipped with pneumatic components.

7. The climbing wall according to claim 1, further comprising angular adjustment means for adjusting a slope of the mobile surface.

8. The climbing wall according to claim 7, wherein the framework further comprises a protective housing for exposing only the at least one continuous flat face.

9. The climbing wall according to claim 1, wherein the flexible coupling links are made of a strip of plastic material providing continuous coupling between the plates.

10. The climbing wall according to claim 1, further comprising climbing holds located on the external face.

* * * * *